United States Patent
Dyke et al.

(10) Patent No.: US 8,908,521 B2
(45) Date of Patent: Dec. 9, 2014

(54) LOAD BALANCING FOR STATEFUL SCALE-OUT NETWORK SERVICES

(75) Inventors: Eric Dyke, Saint-Laurent (CA); Geoffrey Lefebvre, Montreal (CA); Jon Maloy, Montreal (CA); Makan Pourzandi, Montreal (CA); Catherine Truchan, Lorraine (CA)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 166 days.

(21) Appl. No.: 13/439,422

(22) Filed: Apr. 4, 2012

(65) Prior Publication Data

US 2013/0265875 A1 Oct. 10, 2013

(51) Int. Cl.
*H04L 12/26* (2006.01)
*H04L 29/08* (2006.01)

(52) U.S. Cl.
CPC .................................. *H04L 67/1002* (2013.01)
USPC ......................................................... 370/235

(58) Field of Classification Search
None
See application file for complete search history.

(56) References Cited

U.S. PATENT DOCUMENTS

| | | | |
|---|---|---|---|
| 7,369,557 B1 | 5/2008 | Sinha | |
| 7,672,236 B1 | 3/2010 | Karunakaran et al. | |
| 7,877,515 B2 | 1/2011 | Andersson et al. | |
| 8,259,585 B1* | 9/2012 | S P et al. | 370/237 |
| 2005/0249199 A1 | 11/2005 | Albert et al. | |
| 2006/0233106 A1* | 10/2006 | Achlioptas et al. | 370/235 |
| 2008/0256094 A1* | 10/2008 | Gupta et al. | 707/100 |
| 2010/0149966 A1 | 6/2010 | Achlioptas et al. | |
| 2010/0268935 A1 | 10/2010 | Rodgers et al. | |
| 2011/0069632 A1* | 3/2011 | Chen et al. | 370/253 |

FOREIGN PATENT DOCUMENTS

EP 1494422 A2 1/2005

OTHER PUBLICATIONS

Wang, R. et al. "OpenFlow-Based Server Load Balancing Gone Wild." In Proc. Workshop on Hot Topics in Management of Internet, Cloud, and Enterprise Networks and Services (Hot-ICE'11), Mar. 2011, pp. 1-6, Boston, MA.
Wikipedia, the free encylopedia. "Bloom Filter." last modified on Apr. 1, 2012, <URL: http://en.wikipedia.org/wiki/Bloom_filter>.

* cited by examiner

*Primary Examiner* — Otis L Thompson, Jr.
(74) *Attorney, Agent, or Firm* — Coats & Bennett, PLLC

(57) ABSTRACT

A load balancer in a communication network tracks active network flows using a Bloom filter and takes a snapshot of the Bloom filter at the time of a scaling event. The load balancer uses the Bloom filter snapshot to differentiate packets belonging to pre-existing network flows from packets belonging to new network flows. Packets belonging to pre-existing network flows continue to be distributed according to a mapping function in use prior to the scaling event. Packets belonging to new network flows are distributed according to a new mapping function.

12 Claims, 12 Drawing Sheets

LOAD BALANCING FOR STATEFUL SCALE-OUT NETWORK SERVICES

TECHNICAL FIELD

The present invention relates generally to load balancing in a communication network and, more particularly, to load balancing mechanisms for redistributing service loads across a plurality of service instances after a scaling event.

BACKGROUND

In communication networks, such as the Internet, a stateful scale-out network service (SSNS) refers to a service that can be scaled by adding or removing individual service instances to meet changes in traffic demand. For example, a network service may be implemented by multiple servers and the service load may be distributed among the multiple servers. When demand for the service increases, a new server can be added to handle the increased demand without having to reconfigure existing servers. Similarly, when demand decreases, servers can be removed or re-allocated to other uses without reconfiguring the remaining servers. Such events are referred to as "scaling events".

Load balancing is used to distribute service loads across multiple service instances as evenly as possible. The load balancing mechanism should be deterministic, meaning that it directs all packets belonging to the same network flow to the same service instance. The load balancing mechanism also needs to adapt to scaling events. When a scaling event occurs, the load balancing mechanism should adapt its distribution rules to redistribute the load.

In many cases the service instances are stateful and independent, meaning that each service instance maintains some form of state information for each individual network flow, and that this state information is not shared between different service instances. When distributing traffic for stateful services, the load balancing mechanism should ensure that packets belonging to network flows that were active prior to the scaling event will still be forwarded to the same service instance after the scaling event. This forwarding property is referred to as "flow affinity."

Dedicated load balancing appliances offered by some companies are able to maintain flow affinity while being transparent to end users (i.e. no DNS redirection), but they achieve this goal by maintaining state information for every flow. Because many of these appliances act as proxies, the amount of per-flow state information that must be maintained can be substantial. Due to the need to maintain a large amount of state information for every flow, load balancing appliances either fail to scale to large numbers of flows, or they require a large amount of memory and processing power, making them expensive to implement.

Another load balancing approach is described in Open-Flow-Based Server Load Balancing Gone Wild. This approach, based on the OpenFlow protocol, requires that per-flow state information be maintained only during a pre-determined period of time after a scaling event. However, this technique requires an understanding of network protocol semantics to differentiate new flows from existing ones in order to maintain flow affinity after scaling events. This approach does not scale easily due to its reliance on a centralized controller to examine the first packet of every flow.

A third load balancing technique for stateful services is to distribute flows using hash-based techniques as described in RFC 2992 and used in Equal Cost Multi-Path (ECMP) routing. This approach provides deterministic scale-out but does not maintain flow affinity in response to scaling events. A related approach is to use wildcard rules based on the IP 5-tuple (src ip, dst ip, src port, dst port, protocol) and to divide the tuple space into N regions, where N is the number of service instances. Different tuple spaces can be used (source and destination IP address, source IP, etc.). However, this approach also fails to maintain flow affinity in response to scaling events.

U.S. Pat. No. 7,877,515 B2 titled Identity Assignment for Software Components describes different ways of assigning, distributing, and re-distributing functional (logical) addresses to service instances, but does not address the flow affinity problem. According to the '515 patent, all flows, new and existing, are distributed across service instances based on logical addresses, which can be re-distributed during a scaling event. It is up to the service instances themselves to redirect ongoing flows to their original service instance if flow affinity needs to be maintained.

Accordingly, there remains a need for a new approach to load balancing that maintains flow affinity after a scaling event without the need to maintain state information for each network flow.

SUMMARY

Embodiments of the present invention provide a load balancer for redistributing loads across a plurality of service instances in response to a scaling event. When a scaling event occurs, the load balancer must ensure that packets belonging to pre-existing network flows active prior to the scaling event will be forwarded to the same service instance after the scaling event. This forwarding property is referred to as "flow affinity."

To achieve flow affinity, the load balancer tracks the active network flows using a Bloom filter and takes a snapshot of the Bloom filter at the time of the scaling event. The load balancer uses the Bloom filter snapshot to differentiate packets belonging to pre-existing network flows from packets belonging to new network flows. Packets belonging to pre-existing network flows continue to be distributed according to a mapping function in use prior to the scaling event. Packets belonging to new network flows are distributed according to a new mapping function.

In some exemplary embodiments, a rolling Bloom filter is used to track the active network flows. The rolling Bloom filter comprises two or more time-offset bit vectors. Network identifiers associated with the active network flows are inserted into each of the bit vectors. Periodically, the oldest bit vector is discarded and replaced with a new bit vector. The replacement of the bit vector avoids accumulation of stale flow identifiers, are inactive network flows, which would increase the number of false positives when performing lookups in the Bloom filter.

Exemplary embodiments of the invention comprise methods for distributing packets among a plurality of service instances. In one embodiment, active network flows are tracked by adding flow identifiers for the active network flows to a Bloom filter. A snapshot of the Bloom filter is created responsive to a scaling event. The snapshot represents a set of network flows active prior to the scaling event. Flow identifiers for incoming packets are compared with the Bloom filter snapshot to differentiate between pre-existing network flows active prior to the scaling event and new network flows active only after the scaling event. Packets for pre-existing network flows are distributed among a first set of service instances according to a first mapping function in use prior to the scaling event. Packets for new network flows are distributed among a second set of service instances according to a second mapping function.

Other embodiments of the invention comprise a load balancer for distributing packets among a plurality of service instances. The load balancer comprises a network interface for connecting the load balancer to a communication network and a processing circuit to perform the load balancing function. The processing circuit is configured to track active network flows by adding flow identifiers for the active network flows to a Bloom filter, and create a snapshot of the Bloom filter in response to a scaling event. The snapshot represents a set of network flows active prior to the scaling event. The processing circuit is further configured to compare flow identifiers for incoming packets with the Bloom filter snapshot to differentiate between pre-existing network flows active prior to the scaling event and new network flows active only after the scaling event. Packets for pre-existing network flows are distributed among a first set of service instances according to a first mapping function. Packets for new network flows are distributed among a second set of service instances according to a second mapping function.

DETAILED DESCRIPTION

Figure 1:
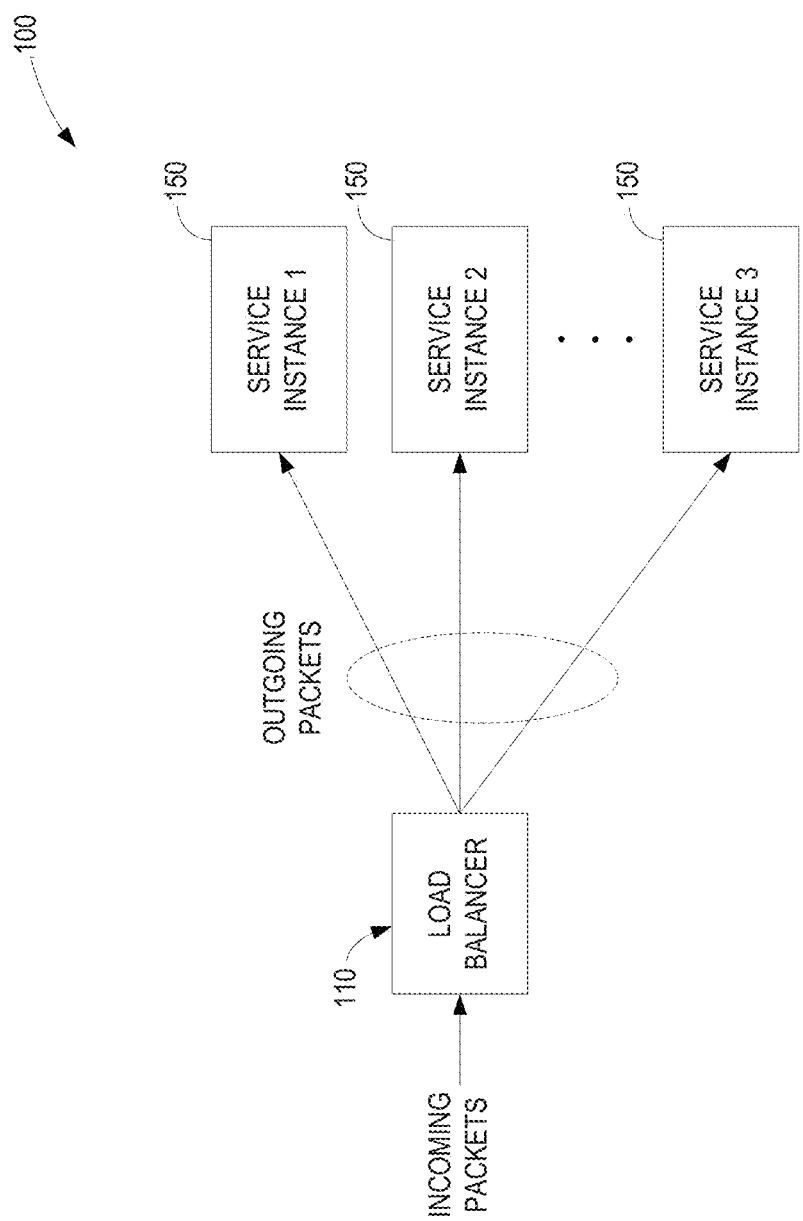
FIG. 1 illustrates a load balancer according to one embodiment of the present invention for distributing packets belonging to different network flows among a plurality of service instances.

Referring now to the drawings, FIG. 1 illustrates an exemplary load-balancing system 100 according to embodiments of the present invention. A packet stream is input to a load balancer 110, which performs load balancing as hereinafter described. The load balancer 110 distributes the packets over a network to a plurality of service instances 150 residing on one or more servers, i.e., computers configured to provide a service. The packet stream includes packets belonging to many different communication sessions, which may be received in a random order. As used herein, the term "network flow" refers to a stream of packets belonging to one such communication session. Each network flow can be uniquely identified by a flow identifier, which may comprise one or more information elements. The load balancer 110 assigns each network flow to one of the service instances 150 to distribute the load as evenly as possible among the service instances. Once a network flow is assigned to a service instance 150, the load balancer 110 routes all packets in the network flow to the same service instance 150.

Each network flow corresponds to a communication session between one of the service instances 150 and a remote device. There are many different types of communication sessions. Some of the more common session types include TCP (Transmission Control Protocol), SIP (Session Initiation Protocol), FTP (File Transfer Protocol), SSL (Secure Socket Layer), IPSec (IP Security), L2TP (Layer 2 Tunneling Protocol, PPTP (Point-to-Point Tunneling Protocol), and RDP (Remote Desktop Protocol). These session types are stateful, meaning that each service instance 150 maintains some form of state information for each individual communication session.

Many network services can be scaled by adding or removing individual service instances 150 to meet changes in demand. When demand for the service increases, a new service instance 150 can be added to handle the increased demand without having to reconfigure existing servers. Similarly, when demand decreases, service instances 150 can be removed without reconfiguring the remaining servers.

When network services are scaled, the load balancer 110 must redistribute the traffic flows among the service instances 150 in use after the scaling event. In the case of stateful services, e.g., SIP, the load balancer 110 must ensure that packets belonging to network flows that were active prior to the scaling event will still be forwarded to the same service instance 150 after the scaling event. This forwarding property is referred to as "flow affinity."

Figure 2A:
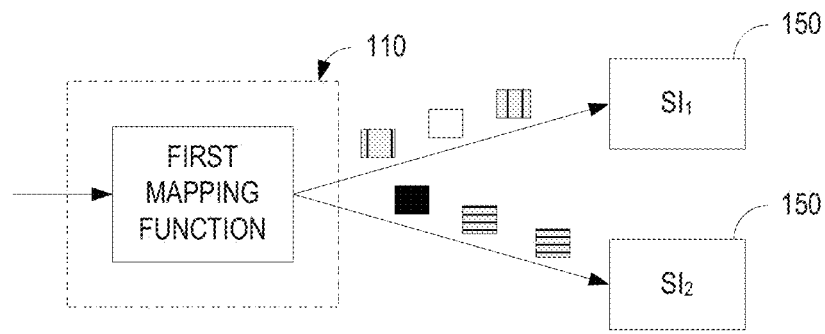
FIGS. 2A and 2B illustrate how the load balancer distributes packets before and after a scaling event.
Figure 2B:
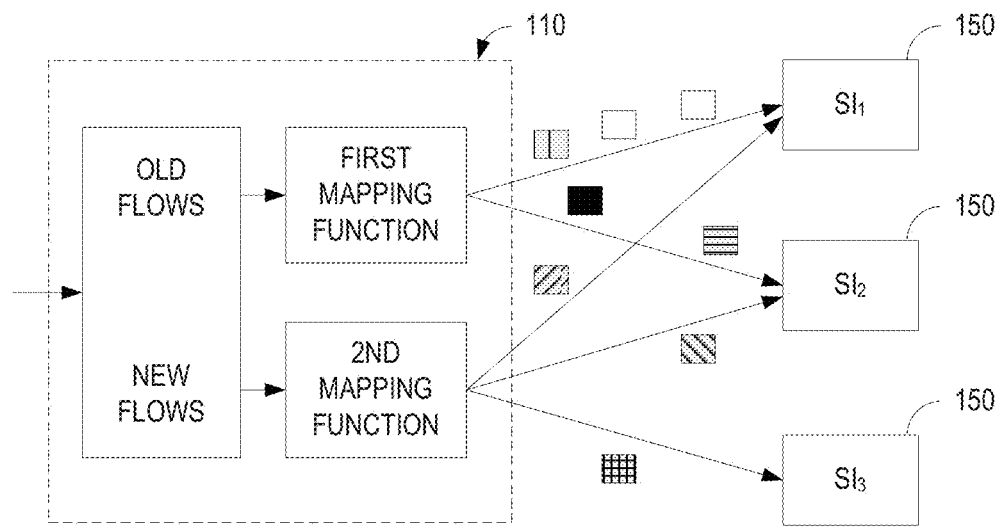

FIGS. 2A/2B illustrate how flow affinity is maintained in embodiments of the present invention. Before a scaling event (FIG. 2A), the load balancer 110 distributes packets among a first set of service instances 150 according to a first mapping function. Packets belonging to the same network flow are distributed to the same service instance 150. The load is balanced by distributing packets belonging to different network flows among the available service instances 150. After a scaling event (FIG. 2B), packets belonging to pre-existing network flows continue to be distributed according to the old mapping function in use prior to the scaling event. The use of the same mapping function for pre-existing network flows ensures that the packets for a given network will continue being distributed to the same service instance 150 before and after the scaling event. Packets belonging to new network flows, i.e. those started after the scaling event, will be distributed according to a new mapping function among all of the available service instances 150, both old and new.

According to exemplary embodiments of the present invention, the load balancer 110 tracks the active network flows using a Bloom filter. A Bloom filter is a probabilistic data structure that provides a very space efficient representation of a set. Bloom filters have false positives, meaning that a membership test may succeed even if the element tested is not part of the set. On the other hand, Bloom filters have no false negatives. If the membership test fails, then that element is not in the set. The load balancer 110 uses the Bloom filter to maintain a history of all active network flows in a predetermined time window prior to a scaling event. After a scaling event, the flow identifiers for incoming packets are tested against a snapshot of the Bloom filter to differentiate packets belonging to pre-existing network flows from packets belonging to new network flows.

The use of the Bloom filter to differentiate packets is advantageous because the membership test will never yield a false negative, thus ensuring that the pre-existing network flows will be distributed using the old mapping functions. False positives are not overly problematic because a false positive only means that packets belonging to a new network flow will be treated the same as packets belonging to a pre-existing network flow. Flow affinity is maintained at the expense of potentially reduced load balancing fairness. This drawback can be addressed with smarter traffic distribution policies and by controlling the rate of false positives.

Figure 3:
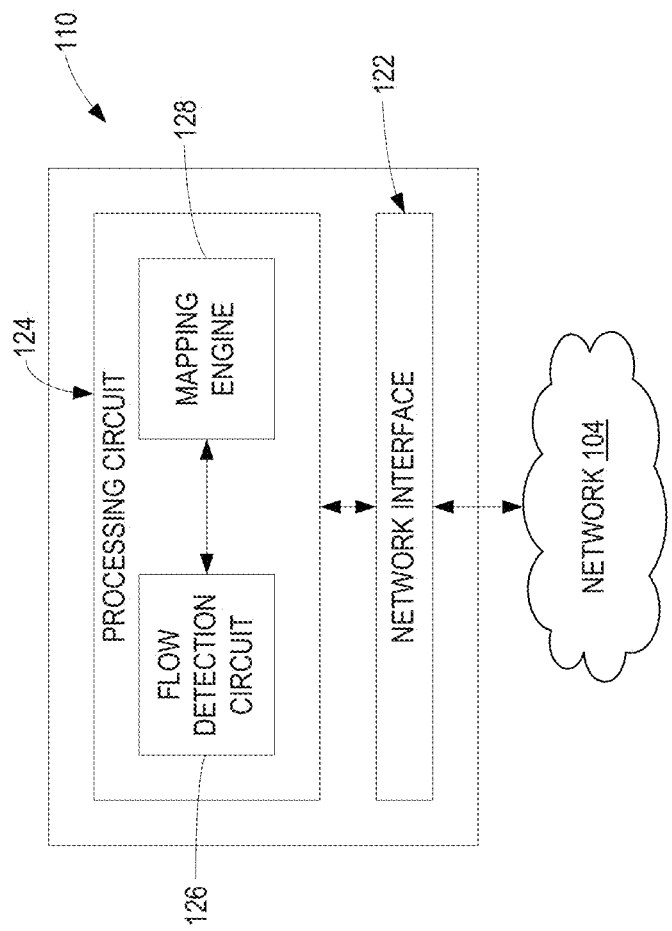
FIG. 3 illustrates the main functional components of the load balancer.

FIG. 3 illustrates an exemplary load balancer 110 according to one embodiment. The load balancer 110 comprises a network interface 122 and a processing circuit 124. The network interface 122 provides connection to a communication network 104, such as a Wide Area Network (WAN). The load balancer 110 receives packets over the network interface 122 and forwards the packets to one of the service instances 150 over the network interface 122. The processing circuit 124 handles the routing and distribution of packets. The processing circuit 124 includes a flow detection circuit 126 and a mapping engine 128. The flow detection circuit 126 uses a Bloom filter as previously described for tracking active network flows. After a scaling event, the flow detection circuit 126 uses a snapshot of the Bloom filter to differentiate packets belonging to pre-existing network flows from packets belonging to new network flows. The mapping engine 128 comprises one or more mapping functions for distributing packets belonging to different network flows among the available service instances 150.

Figure 4:
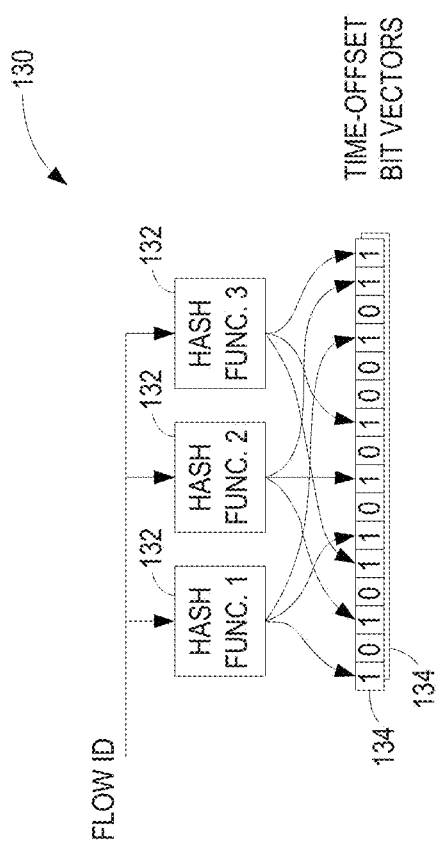
FIG. 4 illustrates the operation of a Bloom filter.

FIG. 4 illustrates the basic operation of a Bloom filter 130 as applied to a load balancer 110. The Bloom filter 130 comprises a plurality of hash functions 132, and two or more time offset bit vectors 134. When a packet arrives at the load balancer 110, the flow identifier for the packet is extracted and input to each of the hash functions 132. Each hash function 132 hashes the flow identifer and generates a set of hash values, each of which corresponds to one of the bit positions in the bit vectors 134. To add a flow identifer to the Bloom filter, the bits in the bit vector 134 at the positions indicated by the hash values are set to "1." The Bloom filter 130 thus represents the set of network flows active prior to a scaling event.

Figure 5:
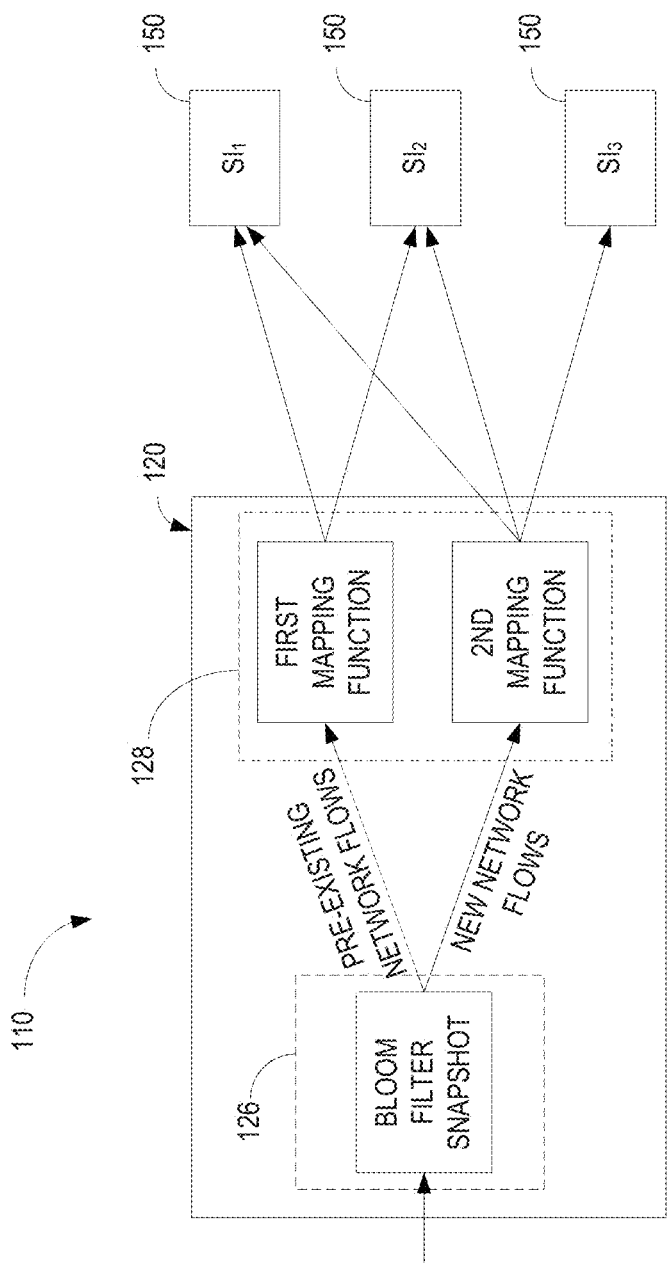
FIG. 5 illustrates the use of the Bloom filter to differentiate packets belonging to pre-existing network flows from packets belonging to new network flows.

When a scaling event occurs, a snapshot of the Bloom filter 130 is saved and used to differentiate pre-existing network flows from new network flows as shown in FIG. 5. The flow identifiers for incoming packets are hashed as previously described and compared with the Bloom filter snapshot. Because the hash functions 132 are deterministic, a match occurs when all of the bits in the bit vector 134 at the positions indicated by the hash values are set to "1." A match means either that the flow identifer is already added to the bit vector, or that a collision (false positive) has occurred. If any one of the bit positions is set to "0", it is ensured that the flow identifer is not a member of the set of pre-existing network flows. Packets belonging to pre-existing network flows continue to be distributed according to the first mapping function in use prior to the scaling event. Packets belonging to new network flows are distributed according to a second mapping function invoked after the scaling event.

In one embodiment, the Bloom filter 130 uses two or more time-offset bit vectors 134. The time offset is denoted $T_{ROLL}$. At periodic intervals, corresponding to the period $T_{ROLL}$, the oldest bit vector 134 is discarded and replaced by a new empty bit vector 134. In embodiments using two bit vectors 134, each bit vector 134 remains in use for a period equal to $2*T_{ROLL}$, so the Bloom filter 130 accumulates flow identifiers over a period equal to $2*T_{ROLL}$. After the rollover, any network flows active over the last rollover period will be preserved. Therefore, the Bloom filter 130 will always contain flow identifiers for all network flows active during the last $T_{ROLL}$ period and possibly up to the last $2*T_{ROLL}$ period. The period $T_{ROLL}$ should be relatively long compared to the average gap between packets of a communication session to avoid false negatives resulting from the loss of data due to rollover.

Figure 6:
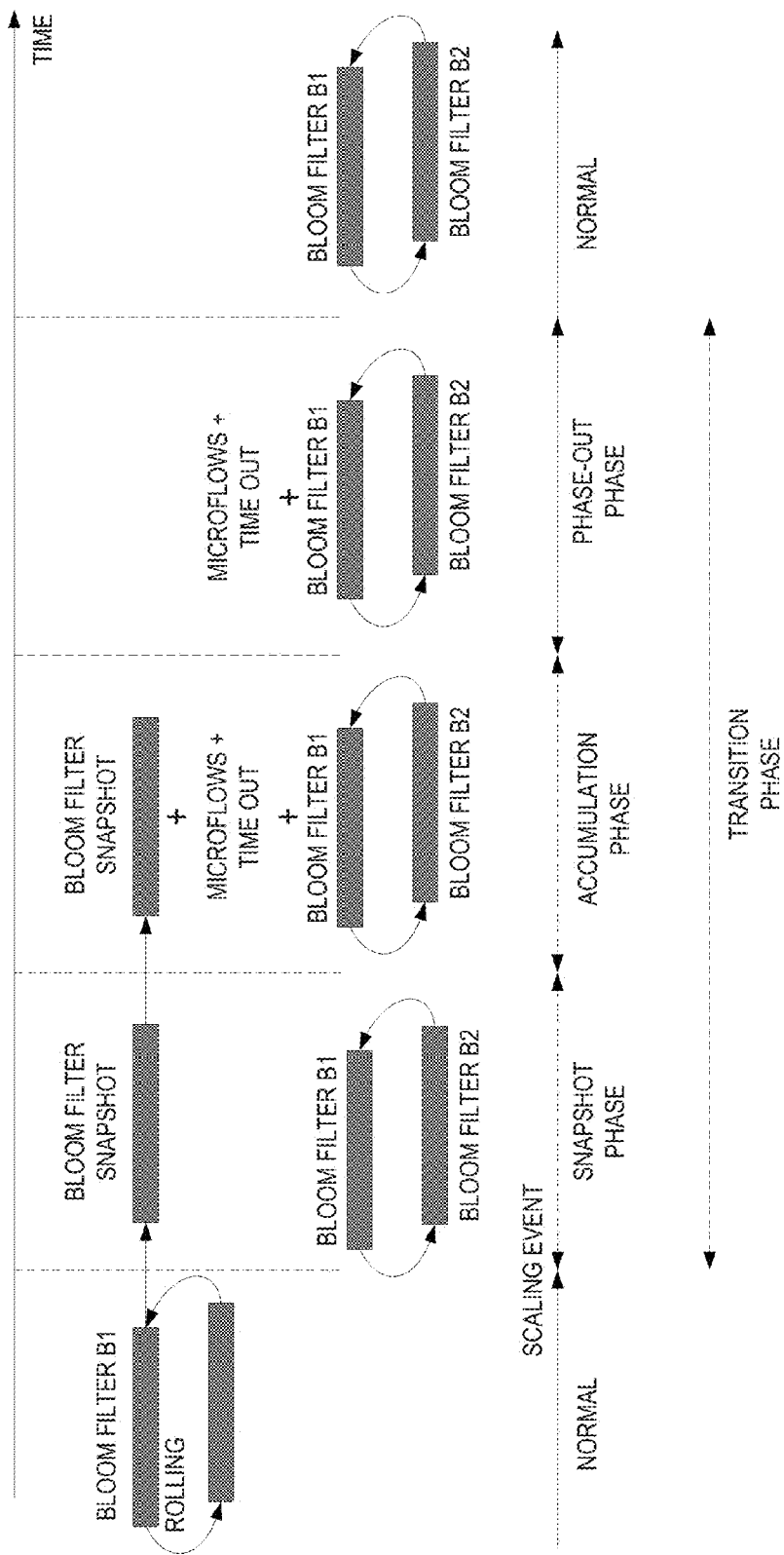
FIG. 6 illustrates the operating phases of the load balancer.

The operation of the load balancer 110 in exemplary embodiments can be divided into a sequence of phases referred to herein as the normal phase, and the transition phase. The transition phase can be further divided into sub-phases referred to as the snapshot phase, the accumulation phase, and the phase-out phase. The phases are shown in FIG. 6.

The normal phase represents the normal mode of operation during which incoming traffic is distributed across service instances using a single mapping function. During this phase, a Bloom filter 130 is used to keep track of currently active flows. Every time a packet is received, the flow identifer is extracted from the header and hashed to generate a key identifying the flow. The key is then inserted in the Bloom filter 130 as previously described. The flow identifer may comprise an Internet Protocol (IP) 5-tuple (source IP, destination IP, source port, destination port, protocol), but any combination of header fields can be used as long as the field values are the same for all packets in the same network flow.

To prevent the Bloom filter 130 from filling up with flow identifiers for stale flows that are no longer active, a rolling Bloom filter with two or more bit vectors 134 may be used to track the active network flows Flow identifiers are inserted in all active bit vectors 134, but every $T_{ROLL}$ seconds, the oldest bit vector 134 is discarded and replaced with an empty bit vector 134. Using two bit vectors 134 as described guarantees that the Bloom filter 130 will contain, at a minimum, flow identifiers for all network flows active in the last $T_{ROLL}$ seconds and, at a maximum, all flow identifiers for network flows active in the last $2*T_{ROLL}$ seconds. It is assumed that all active network flows will send at least one packet every $T_{ROLL}$ seconds. As long as this assumption holds, this mechanism will not produce false negatives More generally, a Bloom filter 130 with N bit vectors will always contain, at a minimum, flow identifiers active for network flows in the last $(N-1)*T_{ROLL}$ seconds and, at a maximum, flow identifiers for network flows active in the last $N*T_{ROLL}$ seconds depending on when the snapshot is taken.

The size of a Bloom filter 130 is based on the number of flow identifiers to store and the desired probability of false positives. The Bloom filter 130 may be dimensioned based on the expected creation rate of new network flows, the length ($T_{ROLL}$) of the rollover period, and a preconfigured probability of false positives.

The parameter $T_{ROLL}$ can either be configured as a fixed value, or it can be automatically and dynamically determined based on the number of network flows stored in the Bloom filter 130. The bit vectors 134 in the Bloom filter 130 are rolled over when the number of entries in the old bit vector reaches a predefined threshold, as long as at least $T_{MIN}$ time has elapsed since the last rollover. $T_{MIN}$ is an alternate configuration parameter used when rolling over based on the number of entries.

The transition phase is triggered by a scaling event. The snapshot phase is the first of three sub-phases in the transition phase. When a scaling event occurs, the load balancer 110 takes a snapshot of the oldest bit vector in the Bloom filter 130. This snapshot is immutable and is used by the load balancer 110 to distinguish pre-existing network flows active prior to the scaling event from new network flows started after the scaling event. More particularly, the flow identifer for every incoming packet is tested for membership in the Bloom filter snapshot. If the membership test succeeds, the packet is deemed to be part of a pre-existing flow and is distributed according to the old mapping function. If the membership test fails, the packet is deemed to be part of a new network flows and is distributed using a new mapping function. As existing flows become inactive, the success ratio of the membership test will fall below a configurable threshold. At this point the load balancer 110 will transition to the accumulation phase.

During the accumulation phase, the load balancer 100 creates a per-flow mapping rule for every pre-existing network flow that is still active. Each per-flow mapping rule represents a mapping between one network flow and a corresponding service instance 150. Similar to the snapshot phase, every incoming packet is tested against the Bloom filter snapshot in the accumulation phase. If the test succeeds, a per-flow mapping rule is created associating the flow identifer with the destination service instance 150 based on the old mapping function. To avoid needless lookups in the Bloom filter snapshot, the flow identifiers for incoming packets can be tested first against the set of existing per-flow mapping rules before being tested against the Bloom filter.

At the end of the accumulation phase, the Bloom filter snapshot and the old mapping function are discarded. Packets for any network flow matching a per-flow mapping rule will be distributed based on the mapping rule; all other packets are deemed part of new network flows and will be distributed according to the new mapping function.

The duration of the accumulation phase is configurable. It can be a predefined constant value, or it can be based on the rate at which per-flow mapping rules are created. If the rule creation rate falls below some threshold, the load balancer 110 transitions to the phase-out phase.

During the phase-out phase, packets that match an existing per-flow mapping rule are distributed based on that mapping rule. The rest of the packets are distributed based on the new mapping function. As the network flows become inactive, the load balancer 110 discards the per-flow mapping rules.

Figure 7:
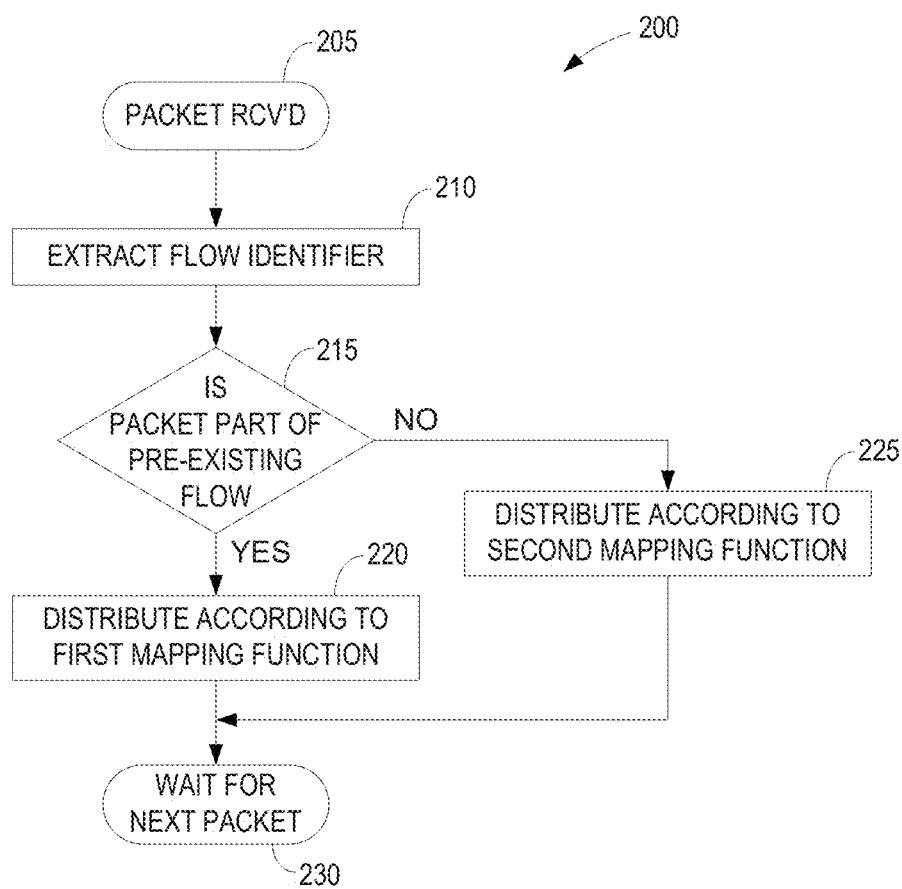
FIG. 7 illustrates a packet distribution method implemented by the load balancer in the snapshot phase of operation.

FIG. 7 illustrates an exemplary method 200 of distributing packets, which is used by the load balancer 110 during the snapshot phase. The procedure 200 begins when a packet is received (block 205). The flow detection circuit 126 extracts the flow identifier from the received packet (block 210) and compares the packet with the Bloom filter snapshot to determine whether the packet is part of a pre-existing flow (block 215). If so, the load balancer 110 distributes the packet according to a first mapping function (block 220). If the packet is not part of a pre-existing network flow, the load balancer 110 distributes the packet according to a new mapping function invoked after the scaling event (block 225). The load balancer 210 then waits for the next packet (block 230).

While in the snapshot phase, the load balancer 110 may monitor the success rate of the membership test applied by the flow detection circuit 126 to differentiate packets belonging to pre-existing network flows from those belonging to new network flows. When the success rate drops below a predetermined level, the load balancer 110 may switch to the accumulation phase.

Figure 8:
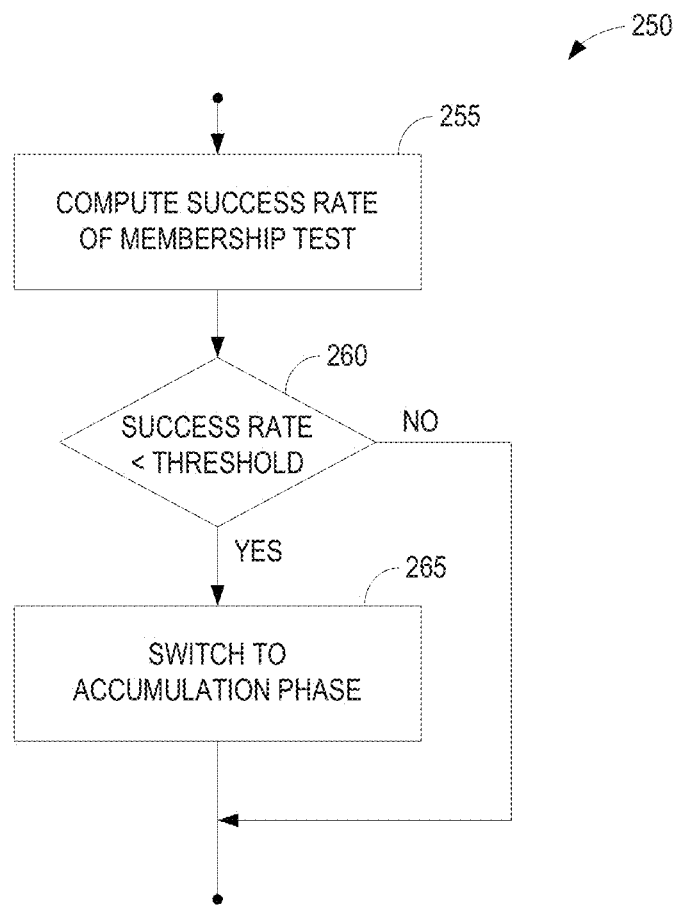
FIG. 8 illustrates a control procedure for triggering transition to the accumulation phase.

FIG. 8 illustrates an exemplary control procedure 250 for determining when to switch from the snapshot phase to the accumulation phase. The load balancer 110 computes the success rate of the membership test used to differentiate packets (block 255), and compares the computed success rate to a predetermined threshold (block 260). The success rate may be recomputed each time the membership test is applied (after block 215 in FIG. 7). If the success rate is less than the threshold, the load balancer 110 switches to the accumulation phase (block 265). Otherwise, the load balancer 110 continues to operate in the snapshot phase.

Figure 9:
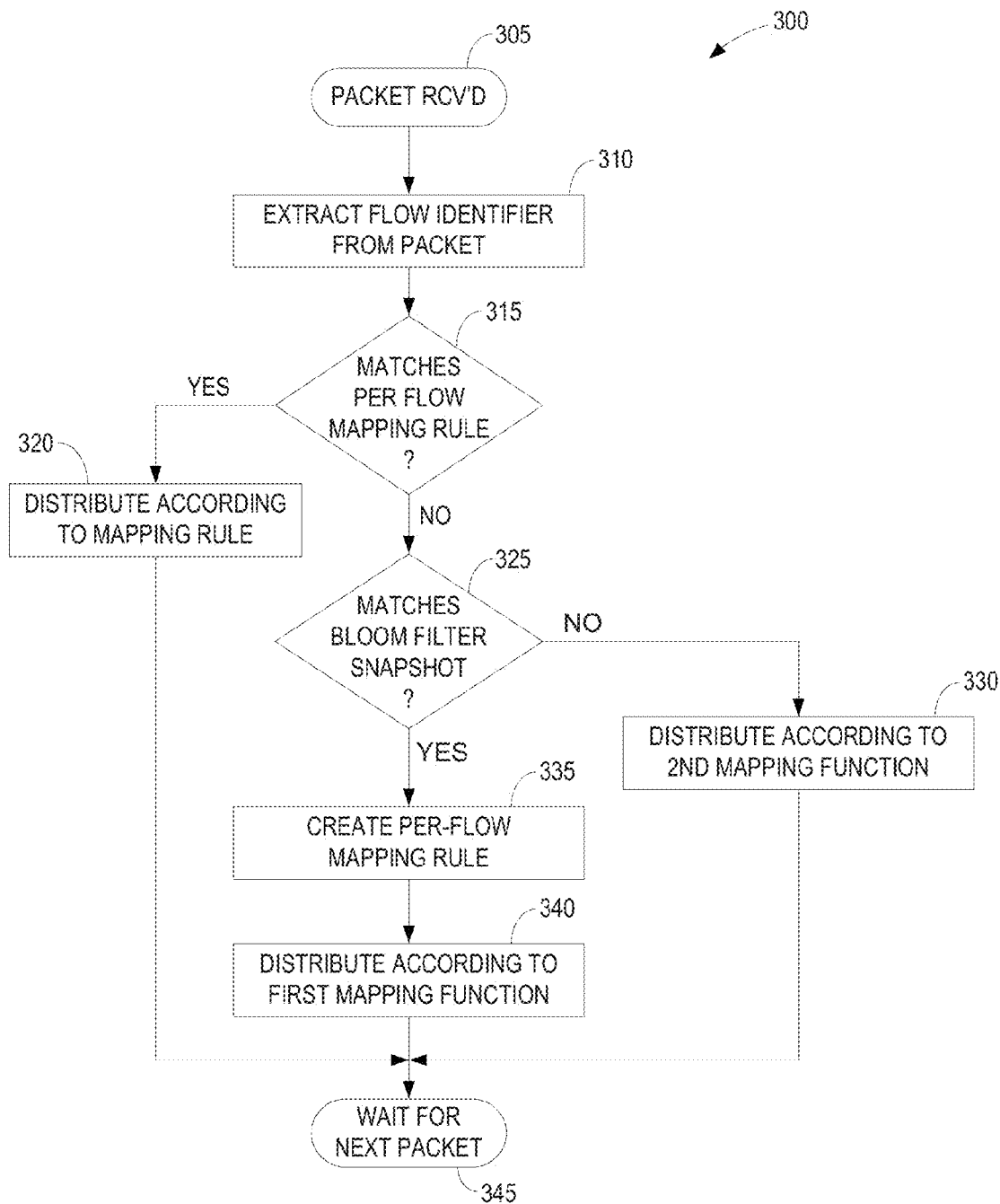
FIG. 9 illustrates a packet distribution method implemented by the load balancer in the accumulation phase of operation.

FIG. 9 illustrates an exemplary method 300 implemented by the load balancer 110 during the accumulation phase. During the accumulation phase, the load balancer 110 creates per-flow mapping rules for pre-existing network flows that are still active. After the packet is received (block 305), the load balancer 110 extracts the flow identifier from the received packet (block 310). The load balancer 110 compares the flow identifier of the received packet against the per-flow mapping rules to determine whether a per-flow mapping rule has been defined for the network flow (block 315). If so, the packet is distributed according to the per-flow mapping rule (block 320). If there is no mapping rule for the corresponding network flow, the load balancer 110 determines whether the flow identifier matches the Bloom filter snapshot (block 325). If no match occurs, the packet is deemed to be part of a new network flow and is distributed according to the second mapping function invoked after the scaling event (block 330). If a match occurs, the load balancer 110 creates a per-flow mapping rule for the corresponding network flow (block 335) and distributes the packet according to the first mapping function (block 340). Once the packet is distributed, the load balancer 110 waits for the next packet (block 345).

Figure 10:
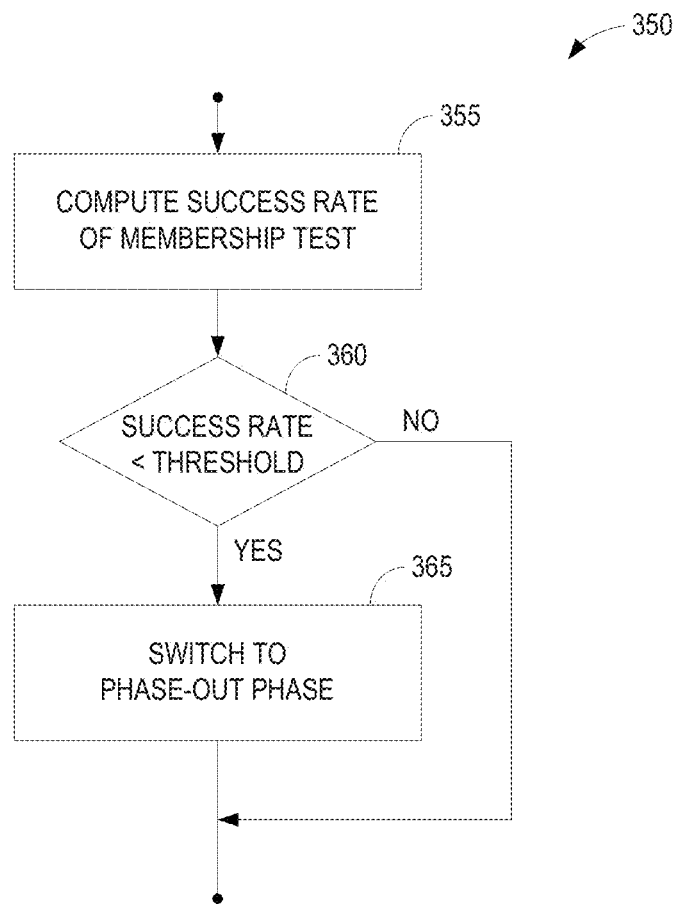
FIG. 10 illustrates a control procedure for triggering transition to the phase-out phase.

FIG. 10 illustrates an exemplary control procedure 350 for determining when to switch from the accumulation phase to the phase-out phase. While in the accumulation phase, the load balancer 110 may continue to monitor the success rate of the membership test. The load balancer 110 computes the success rate of the membership test (block 355) as previously described. The load balancer then compares the success rate to a predetermined threshold (block 360). In this case, the threshold applied is lower than the threshold used during the snapshot phase. If the success rate drops below the threshold, the load balancer 110 switches to the phase-out phase (block 365).

Figure 11:
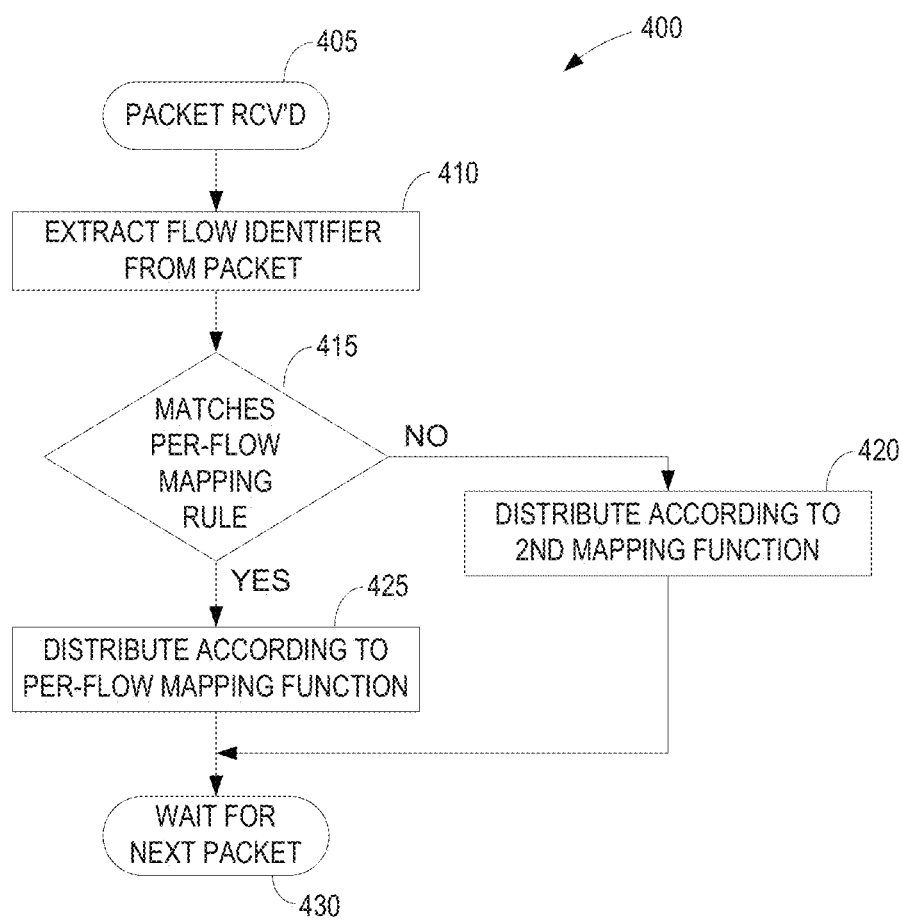
FIG. 11 illustrates a packet distribution method implemented by the load balancer in the phase-out phase of operation.

FIG. 11 illustrates an exemplary method 400 implemented by the load balancer 110 during the phase-out phase. When a packet is received (block 405), the load balancer 110 extracts the flow identifier from the received packet (block 410). The load balancer 110 matches the flow identifier with the per-flow mapping rules to determine whether the flow identifier matches one of the per-flow mapping rules (block 415). If not, the packet is deemed to be part of a new network flow and is distributed according to the second mapping function (block 420). If a match occurs, the packet is distributed according to the corresponding per-flow mapping rule (block 425). After distribution of the packet, the load balancer 110 waits for the next packet (block 430).

During the phase-out phase, the per-flow mapping rules are discarded as the network flows become inactive. Eventually, all the per-flow mapping rules will be discarded and the load balancer 110 will effectively return to the normal phase using the second mapping function.

Figure 12:
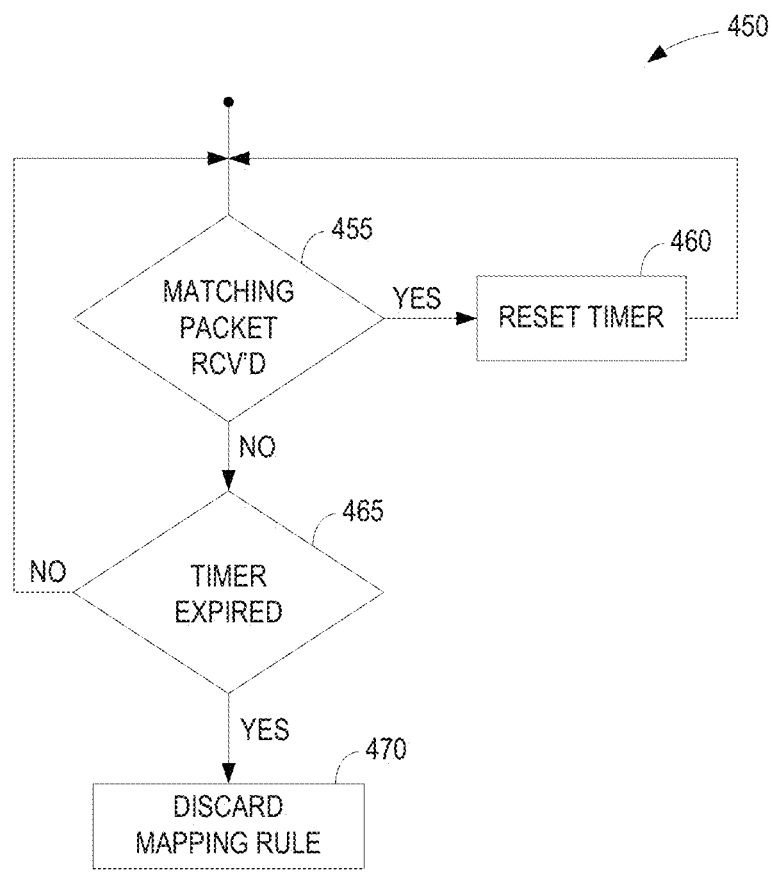
FIG. 12 illustrates a control procedure implemented during the phase-out phase for discarding per-flow mapping rules.

FIG. 12 illustrates a control method 450 for discarding per-flow mapping rules. The load balancer 110 operates a timer for each network flow. The timer runs until either another packet in the same network flow is received or until the timer expires. If a packet matching the network flow is received prior to the expiration of the packet (block 455), the load balancer 110 resets the timer (block 460). If the timer expires before receipt of the next packet in the network flow (block 465), the load balancer 110 presumes that the network flow is inactive and discards the mapping rule (block 470).

Thus, the foregoing description and the accompanying drawings represent non-limiting examples of the methods and apparatus taught herein. As such, the present invention is not limited by the foregoing description and accompanying drawings. Instead, the present invention is limited only by the following claims and their legal equivalents.

What is claimed is:

1. A method of balancing loads in a communication network, said method comprising:
    tracking active network flows by adding flow identifiers for the active network flows to a Bloom filter;
    creating a snapshot of the Bloom filter responsive to a scaling event, the snapshot being indicative of a set of network flows active prior to the scaling event;
    comparing flow identifiers for incoming packets with the Bloom filter snapshot to differentiate between pre-existing network flows active prior to the scaling event and new network flows active only after the scaling event;
    distributing packets for pre-existing network flows among a first set of service instances according to a first mapping function; and
    distributing packets for new network flows among a second set of service instances according to a second mapping function;
    creating one or more per-flow mapping rules for the pre-existing network flows responsive to matches with the Bloom filter when matches between the incoming packets and the Bloom filter drop to a first predetermined level;
    switching from distributing packets for a pre-existing network flow according to the first mapping function to distributing packets for the pre-existing network flow according to a per-flow mapping rule if a per-flow mapping rule exists for the pre-existing network flow.

2. The method of claim 1 wherein tracking active network flows with a Bloom filter comprises:
    tracking active network flows with a rolling Bloom filter including two or more time-offset bit vectors; and
    periodically replacing an oldest one of said time-offset bit vectors with a new time-offset bit vector.

3. The method of claim 2 wherein creating a snapshot of the Bloom filter comprises creating a snapshot of the oldest active bit vector.

4. The method of claim 1, wherein said switching comprises:
    determining based on the flow identifier for an incoming packet whether a per-flow mapping rule exists;
    if a per-flow mapping rule exists, distributing the packet according to the per-flow mapping rule; and
    if no per-flow mapping rule exists, distributing the packet according to either the first or second mapping function depending on whether the packet is part of a pre-existing network flow.

5. The method of claim 1, further comprising discontinuing distribution of packets for all of the pre-existing network flows according to the first mapping function when matches between the incoming packets and the Bloom filter drop to a second predetermined level.

6. The method of claim 1, further comprising discarding a per-flow mapping rule for a pre-existing network flow when the pre-existing network flow becomes inactive.

7. A load balancer in a communication network for distributing packets among a plurality of service instances, said load balancer comprising:
    a network interface for connecting the load balancer to a communication network; and
    a processing circuit configured to:
        track active network flows by adding flow identifiers for the active network flows to a Bloom filter;
        create a snapshot of the Bloom filter responsive to a scaling event, the snapshot being indicative of a set of network flows active prior to the scaling event;
        compare flow identifiers for incoming packets with the Bloom filter snapshot to differentiate between pre-existing network flows active prior to the scaling event and new network flows active only after the scaling event;
        distribute packets for pre-existing network flows among a first set of service instances according to a first mapping function; and
        distribute packets for new network flows among a second set of service instances according to a second mapping function;
        create one or more per-flow mapping rules for the pre-existing network flows responsive to matches with the Bloom filter when matches between the incoming packets and the Bloom filter drop to a first predetermined level; and
        switch from distributing packets for a pre-existing network flow according to the first mapping function to distributing packets for the pre-existing network flow according to a per-flow mapping rule if a per-flow mapping rule exists for the pre-existing network flow.

8. The load balancer of claim 7 wherein the processing circuit is configured to:
    track active network flows with a rolling Bloom filter including two or more time-offset bit vectors; and
    periodically replace an oldest one of said time-offset bit vectors with a new time-offset bit vector.

9. The load balancer of claim 8 wherein the processing circuit is further configured to create a snapshot of the Bloom filter from the oldest active bit vector.

10. The load balancer of claim 7, wherein the processing circuit is further configured to:
    determine based on the flow identifier for an incoming packet whether a per-flow mapping rule exists;
    if a per-flow mapping rule exists, distribute the packet according to the per-flow mapping rule; and
    if no per-flow mapping rule exists, distribute the packet according to either the first or second mapping function depending on whether the packet is part of a pre-existing network flow.

11. The load balancer of claim 7, wherein the processing circuit is further configured to discontinue distribution of packets for all of the pre-existing network flows according to the first mapping function when matches between the incoming packets and the Bloom filter drop to a second predetermined level.

12. The load balancer of claim 7, wherein the processing circuit is further configured to discard a per-flow mapping rule for a pre-existing network flow when the pre-existing network flow becomes inactive.

* * * * *